(12) United States Patent
Infante

(10) Patent No.: US 11,659,961 B1
(45) Date of Patent: May 30, 2023

(54) MULTI-PURPOSE COOKING TOOL

(71) Applicant: Magnefuse, LLC, Miami, FL (US)

(72) Inventor: Alfredo Infante, Miami, FL (US)

( * ) Notice: Subject to any disclaimer, the term of this patent is extended or adjusted under 35 U.S.C. 154(b) by 333 days.

(21) Appl. No.: 17/007,695

(22) Filed: Aug. 31, 2020

Related U.S. Application Data

(63) Continuation-in-part of application No. 15/979,677, filed on May 15, 2018, now Pat. No. 10,758,070.

(60) Provisional application No. 62/484,763, filed on Apr. 12, 2017.

(51) Int. Cl.
*A47J 43/28* (2006.01)

(52) U.S. Cl.
CPC ........... *A47J 43/288* (2013.01); *A47J 43/283* (2013.01)

(58) Field of Classification Search
CPC .............................. A47J 43/288; A47J 43/283
USPC .............................................. 7/110, 112, 113
See application file for complete search history.

(56) References Cited

U.S. PATENT DOCUMENTS

| | | | |
|---|---|---|---|
| 1,053,387 A * | 2/1913 | Hawley | A47G 21/06 30/147 |
| 4,524,512 A * | 6/1985 | Formo | A47G 21/06 30/147 |
| 5,327,650 A * | 7/1994 | Rojas | A47G 21/06 30/147 |
| 7,013,568 B2 * | 3/2006 | Schmidt | A47G 21/06 D7/645 |
| 8,726,525 B2 * | 5/2014 | Bagley | B26B 21/52 30/279.2 |
| 2007/0006465 A1 * | 1/2007 | Lee | A47G 21/02 30/142 |
| 2012/0297548 A1 * | 11/2012 | Solari | A47J 43/288 294/7 |
| 2013/0305893 A1 | 11/2013 | Kaufman | |

* cited by examiner

*Primary Examiner* — Hadi Shakeri
(74) *Attorney, Agent, or Firm* — Sanchelima & Associates, P.A.; Christian Sanchelima; Jesus Sanchelima

(57) ABSTRACT

A system for including a multi-purpose cooking tool including a spatula assembly, a tongs assembly and a fork assembly is disclosed. The spatula assembly includes a spatula with a top cavity and a bottom cavity. Removably secured flushly within the top cavity are tongs from the tongs assembly. Removably secured flushly within the bottom cavity is a fork of the fork assembly. The tongs, fork and spatula secured together in a compact configuration. With the tongs, fork and spatula all being readily available to use during cooking.

12 Claims, 3 Drawing Sheets

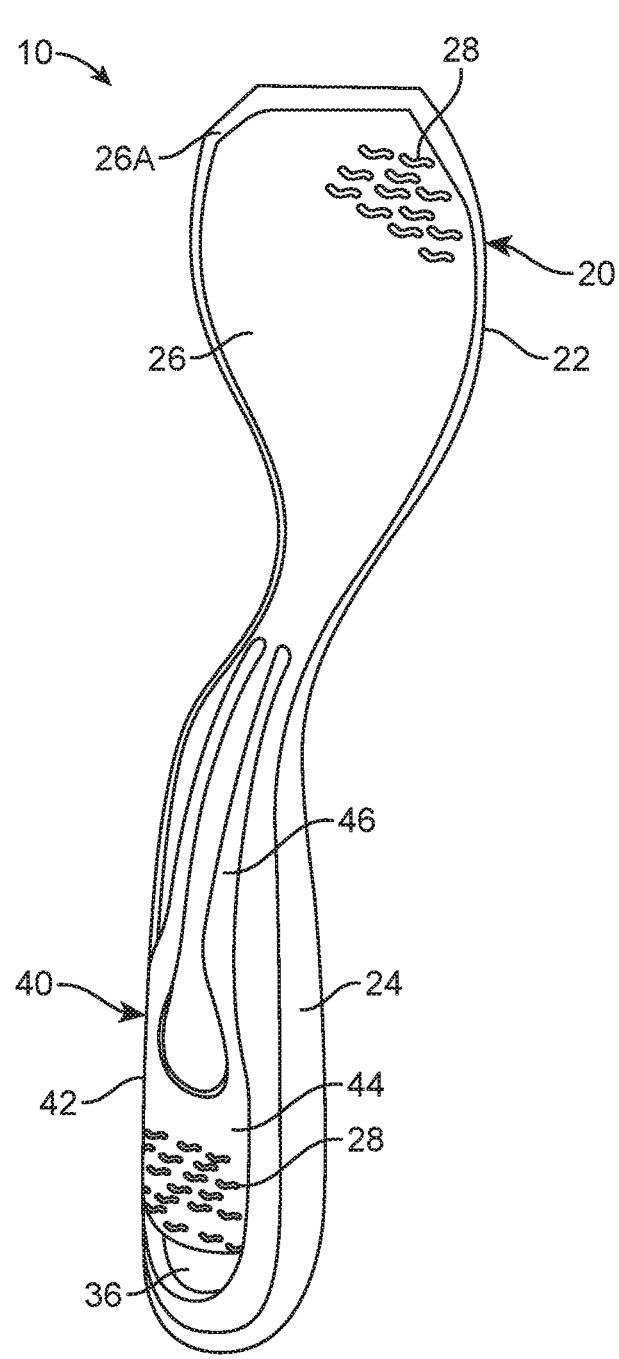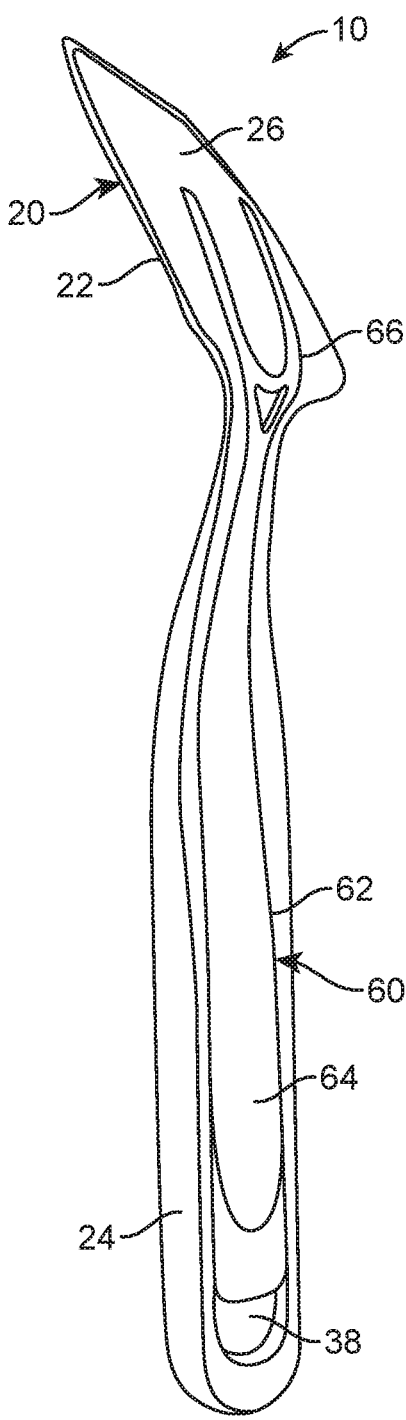
FIG. 1
FIG. 2

MULTI-PURPOSE COOKING TOOL

RELATED APPLICATIONS

The present application is a continuation-in-part and claims the benefit of the priority date of pending U.S. patent application Ser. No. 15/979,677 filed on May 15, 2018, which is hereby incorporated by reference.

BACKGROUND OF THE INVENTION

Field of the Invention

The present invention relates to a cooking utensil and, more particularly, to a multi-purpose cooking utensil that combines tongs, a fork and a spatula together.

Description of the Related Art

Several designs for multi-purpose cooking utensils have been designed in the past. None of them, however, include a configuration as a spatula in its initial position that mains the necessary curvature to keep a user's hands safely away from a heating element. Additionally, removably secured to the spatula are a fork member and a tongs member.

Applicant believes that a related reference corresponds to U.S. patent application No. US20130305893 filed by Ben Kaufman. However, it differs from the present invention because the Kaufman reference includes a device that is a tong in its initial configuration and requires a cumbersome clipping attachment means to clip its prong to one of the faces of the tong, thereby converting the utensil into a spatula in a way that does not provide for the curvature to keep a user's hands safely away from heat. In addition, the Kaufman reference includes complicated clip attachment means that are difficult to use and prone to failure. Additionally, the tongs and fork are readily available and easily removable for usage from spatula for the present invention.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a multi-purpose cooking tool that cooperates with a plurality of purposes required around a kitchen or bar-b-q setting.

It is another object of this invention to provide a multi-purpose cooking tool that is ergonomic and can be easily and readily stored with a minimalist profile and space requirements.

It is still another object of the present invention to provide a multi-purpose cooking tool that includes tongs, a fork and a spatula, whereby the spatula maintains a curvature to keep a user's hand safely away from a heat source, the tongs and fork are readily available and detachable from the spatula.

It is also another object of the present invention to provide such a multi-purpose cooking tool that allows a user to easily transition from one tool or utensil to the next.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric top view of multi-purpose cooking tool 10.

FIG. 2 shows an isometric bottom view of multi-purpose cooking tool 10.

DETAILED DESCRIPTION OF THE EMBODIMENTS OF THE INVENTION

Figure 3:
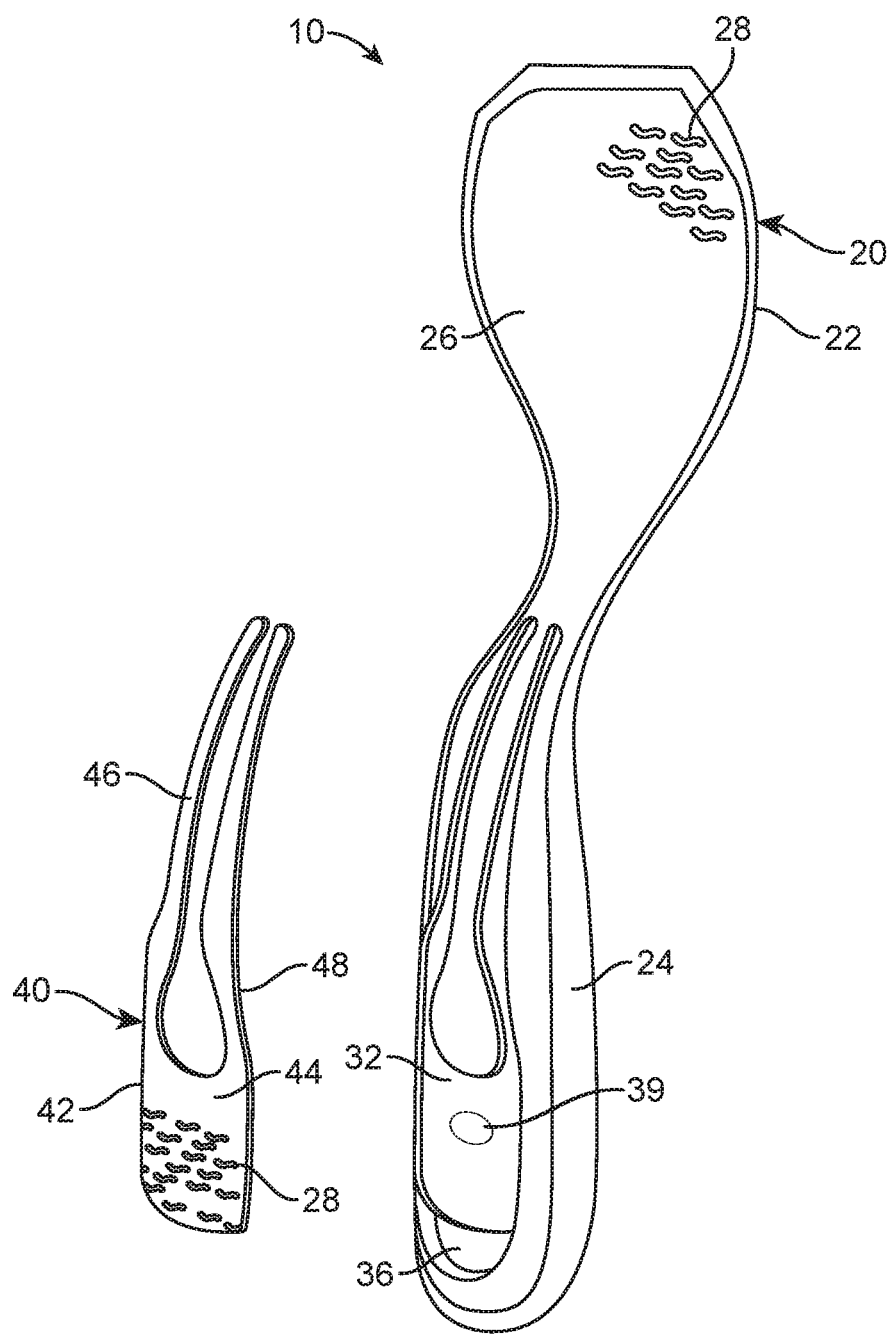
FIG. 3 illustrates an isometric view of spatula 22 with tongs 42 removed therefrom.

Referring now to the drawings, where the present invention is generally referred to with numeral 10, it can be observed that a multi-purpose cooking tool 10 basically includes a spatula assembly 20, a tongs assembly 40 and a fork assembly 60.

Multi-purpose cooking tool 10, as best seen in FIGS. 1-4, may help to facilitate the process of cooking by allowing one tool or utensil to be used during the process. Tongs assembly 40 and fork assembly 60 are readily available and detachable from spatula assembly 20 allow for more efficient cooking with the necessary utensils.

Spatula assembly 20 may include a spatula 22, as best seen in FIGS. 1-2. Spatula 22 may be used to handle food elements while cooking to avoid injury or burns to the user from a heating source used to cook the food elements. It is to be understood that spatula 22 may be made of a heat resistant material to prevent melting when near heat. Spatula 22 may include a handle 24. Handle 24 may extend a partial length of spatula 22. Importantly, handle 24 may include a curvature configuration to keep a user's hand safely away from a heat source for added safety during handling of food elements. Handle 24 may have an ergonomic shape that facilitates comfortable operating of handle 24 by the user.

Mounted to handle 24 may be a head 26. Head 26 may be substantially flat to facilitate handling of food elements thereon. In one embodiment, head 26 may be wider than handle 24. Head 26 may include a lip 26a extending about a perimeter of head 26. It is to be understood that head 26 may protrude outwardly and away from lip 26a. Lip 26a may be flatter than head 26.

Spatula 22 may further include grip members 28 located at predetermined areas of head 26. Grips members 28 may have a high friction coefficient for better grip. Grip members 28 better secure food elements onto spatula 22 to avoid accidental droppings. Preferably, grip members 28 may be adjacent to each other. It may also be suitable for grip members 28 to be parallel to each other. In one embodiment, grip members 28 may be arranged in a substantially triangular configuration. In one implementation, grip member 28 may protrude outwardly and away from head 26. Suitably, grip members 28 may be flush with head 26. In yet another embodiment, grip members 28 may be recessed within head 26.

As best seen in FIG. 3, spatula 22 may include a top cavity 32 recessed therein. Top cavity 32 may be used to secure tongs 42 from tongs assembly 40 to spatula 22. More specifically, top cavity 32 may extend a partial length of handle 24. Top cavity 32 be of a shape and dimensions that cooperates with tongs 42. Tongs 42 may be received snuggly within top cavity 32. Top cavity 32 permits tongs 42 to be flush with spatula 22 when stored. Tongs 42 may be surrounded and compressed by top cavity sidewalls within top cavity 32. The top cavity sidewalls may compress and pressurize tongs 42 within top cavity 32 for secure attachment thereto. In one implementation, within top cavity 32 may be magnets 39, for additional securement of tongs 42 within top cavity 32. It may be suitable for tongs 42 to include attached corresponding magnets 39 that cooperate with magnets 39 within top cavity 32 to ensure that tongs 42 remain secured within top cavity 32. At least one of magnets 39 may be suitable within top cavity 32. To facilitate removal and retrieval of tongs 42 from top cavity 32, spatula 22 may include a top indentation 36 recessed therein. Top indentation 36 may be adjacent to and in constant abutting contact with top cavity 32. Top indentation 36 may be below top cavity 32. It is to be understood that tongs 42 may be grasped and removed from top cavity 32 with top indentation 36. Top indentation 36 may lead to top cavity 32. A finger of the user may be inserted into top indentation 36 until the finger is within top cavity 32 and below tongs 42. Subsequently, tongs 42 may be pulled out from top cavity 32 with the finger of the user. In one implementation, top cavity 32 and top indentation 36 may be integral and unite when tongs 42 are removed from spatula 22.

Figure 4:
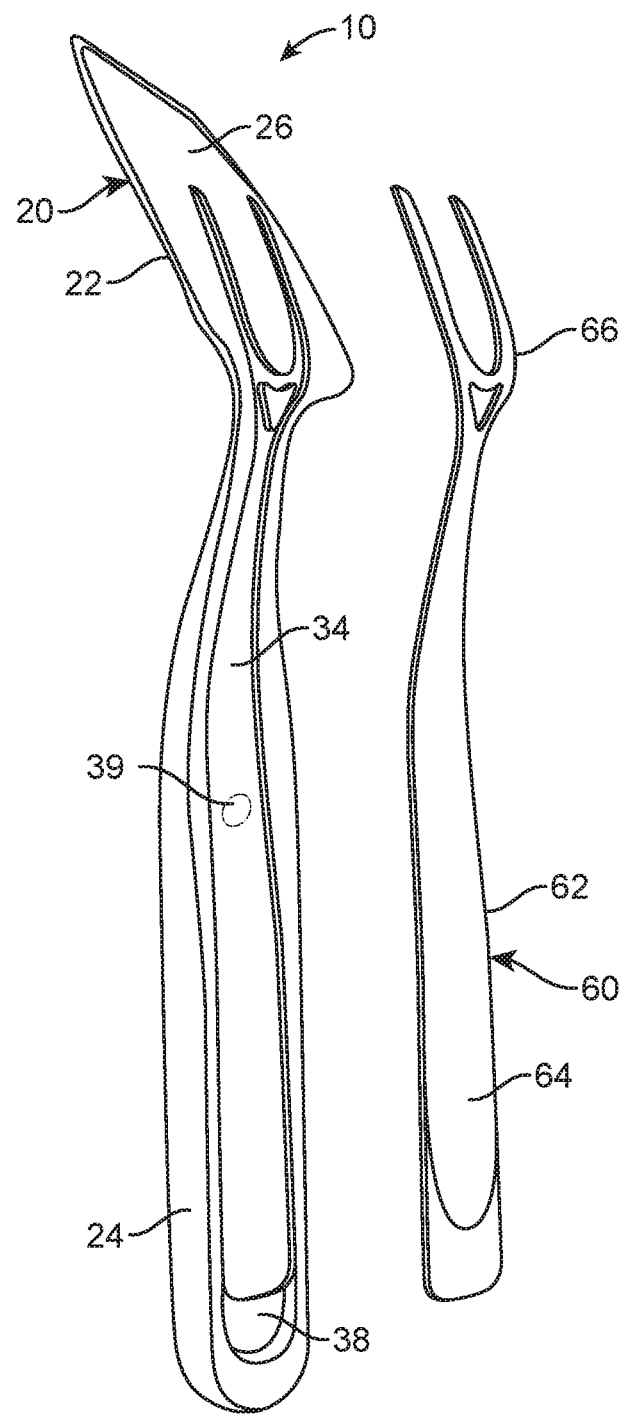
FIG. 4 is a representation of an isometric view of spatula 22 with fork 62 removed therefrom.

As best seen in FIG. 4, spatula 22 may include a bottom cavity 34 recessed therein. Bottom cavity 34 may be used to secure a fork 62 from fork assembly 60 to spatula 22. More specifically, bottom cavity 34 may extend a partial length of spatula 22. Bottom cavity 34 may be include a greater length than that of top cavity 32. Bottom cavity 32 be of a shape and dimensions that cooperates with fork 62. Fork 62 may be received snuggly within bottom cavity 34. Bottom cavity 34 permits fork 62 to be flush with spatula 22 when stored. Fork 62 may be surrounded by bottom cavity sidewalls within bottom cavity 34. The bottom cavity sidewalls may compress and pressurize fork 62 within bottom cavity 34 for secure attachment thereto. In one implementation, within bottom cavity 34 may be additional of magnets 39, for additional securement of fork 62 within bottom cavity 34. It may be suitable for fork 62 to include attached corresponding magnets 39 that cooperate with magnets 39 within bottom cavity 34 to ensure that fork 62 remains secured within bottom cavity 34. At least one of magnet 39 may be suitable within bottom cavity 34. To facilitate removal and retrieval of fork 62 from bottom cavity 34, spatula 22 may include a bottom indentation 38 recessed therein. Bottom indentation 38 may be adjacent to and in constant abutting contact with bottom cavity 34. Bottom indentation 38 may be below bottom cavity 34. It is to be understood that fork 62 may be grasped and removed from bottom cavity 34 with bottom indentation 38. Bottom indentation 38 may lead to bottom cavity 34. A finger of the user may be inserted into bottom indentation 38 until the finger is within bottom cavity 34 and below fork 62. Subsequently, fork 62 may be pulled out from bottom cavity 34 with the finger of the user. In one embodiment, bottom cavity 34 and bottom indentation 38 may be integral and unite when fork 62 is removed from spatula 22.

Tongs 42 as best seen in FIGS. 1 and 3, may help users grasp food elements. Tongs 42 are readily available and removable from spatula 22. It may be suitable for tongs 42 to also be referred to as a pair of tongs. In one implementation, tongs 42 may be referred to as a first utensil member. Tongs 42 may include tongs handle 44 and tongs prongs 46. The user may grasp and maneuver tongs 42 with tongs handle 44. Tongs handle 44 may be substantially palmed by the hand of the user. In one embodiment, tongs handle 44 may include additional of grip members 28. Grip members 28 may help to allow for better grasping of tongs 42 to avoid accidental slippage or dropping of tongs 42. Tongs prongs 46 may extend outwardly and away from tongs handle 44. Tongs prongs 46 may be identical to each other. Tong prongs 46 may be parallel to each other. It is to be understood that tong prongs 46 may be flexible and compressible. Tong prongs 46 may move towards and away from one another. While there is a need to grasp food elements or the like, tong prongs 46 may be compressed by the user using indentations 48. Indentations 48 may be on the outer side of each of tong prongs 46. Upon indentations 48 being engaged and compressed, tong prongs 46 do as well to grasp. Upon indentations 48 being released, tong prongs 46 do as well releasing what was previously grasped.

Fork 62 as best seen in FIGS. 2 and 4, may help to grasp food elements. It is to be understood that tongs 42 and fork 62 may grasp food elements in different manners. In one implementation, fork 62 may be referred to as a second utensil member. Fork 62 may include a fork handle 64 and fork prongs 66. The user may grasp and maneuver fork 62 with fork handle 64. Fork handle 64 may have an ergonomic shape that helps the user to comfortably grasp fork 62. In an alternate embodiment, fork handle 64 may include additional of grip members 28. Grip members 28 may help to allow for better grasping of fork 62 to avoid accidental slippage or dropping of fork 62. Fork prongs 66 may extend outwardly and away from fork handle 64. Fork prongs 66 may be identical to each other. Fork prongs 66 may be parallel to each other, preferably. It is to be understood that fork prongs 66 may be flexible. The distal ends of fork prongs 66 may be sharp in embodiment, to allow for food elements to be poked or stab for carrying thereof. It may be suitable for fork prongs 66 to be flat for added safety. However, it is to be understood that fork prongs 66 may be capable of engaging food elements perpendicularly by poking through them to engage the food elements. It is to be understood that food elements may alternatively be supported on fork prongs 66.

Multi-purpose cooking tool 10 may help users to remain adaptive while cooking as utensils or tools needed while cooking remain readily available. The present invention includes multiple utensils in one compact package. The user may engage food elements with spatula 22, tongs 42 or fork 62. Spatula 22 maintains a curvature needed to keep the user safe from heat. Spatula 22 also houses tongs 42 and fork 62. Multi-purpose cooking tool 10 allows for more efficiency while cooking.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a multipurpose cooking tool, comprising:
a spatula having a handle and a head, a first utensil member and a second utensil member, said first utensil member being flushly secured to a top of the handle within a top cavity surrounded by top handle sidewalls, said first utensil member being compressed within said top cavity by said top handle sidewalls to close said first utensil member, said second utensil member flushly secured to a bottom of the handle within a bottom cavity surrounded by bottom handle sidewalls, said head is substantially circular-shaped, said head protruding diagonally forward from said handle, wherein within each of said top cavity and said bottom cavity is at least one magnet that further secures said first utensil member and said second utensil member to said top cavity and said bottom cavity respectively, said top cavity extends a partial length of said handle, said top cavity conform with a shape of said first utensil member, wherein said bottom cavity extends a partial length of said handle and a partial length of said head, wherein said first utensil is a tong, said tong including tongs prongs and a tong handle, wherein said tongs prongs extend upwardly from said tong handle, said tongs prongs are separated a predetermined distance, said predetermined distance defining an U-shaped indentation, wherein said second utensil member is a fork, said fork having a fork handle and two fork prongs, said two fork prongs extend upwardly from said fork handle, said two fork prongs are separated defining an U-shaped fork, wherein said two fork prongs being in constant abutting contact with a rear portion of said head when said second utensil member is secured to said handle within said bottom cavity by said bottom handle sidewalls, wherein said fork handle is secured into said bottom cavity, said two fork prong partially extending in said rear portion of said head.

2. The multipurpose cooking tool of claim 1, wherein said spatula further includes grip members on said head, wherein said tong handle includes said grip members.

3. The multipurpose cooking tool of claim 2, wherein said grip members being on a top portion of said spatula, said grip members extending horizontally and being adjacent to each other.

4. The multipurpose cooking tool of claim 1, wherein said tongs handle includes additional of said grip members.

5. The multipurpose cooking tool of claim 1, wherein said tongs prongs compress and expanded adapted for grasping, wherein said tongs prongs expand outwardly from said U-shaped indentation, wherein said tongs prongs retract towards the center of said U-shape indentation, said U-shaped indentation having a top portion and a bottom portion, said bottom portion having a length larger than a length of said top portion.

6. The multipurpose cooking tool of claim 1, wherein said spatula includes a lip extending about the perimeter of said head, said lip is flatter than said head.

7. The multipurpose cooking tool of claim 1, wherein said first utensil member is retrieved from said top cavity through a top indentation located adjacent to said top cavity.

8. The multipurpose cooking tool of claim 1, wherein said second utensil member is retrieved from said bottom cavity through a bottom indentation located adjacent to said bottom cavity.

9. The multipurpose cooking tool of claim 1, wherein said fork handle includes a connecting portion, said connecting portion connects said fork handle with said fork prongs, said connecting portion has a triangular opening in a central portion thereof.

10. The multipurpose cooking tool of claim 1, wherein said handle has a bottom handle and a neck, said bottom handle has a greater length than a length of said neck.

11. A system for a multipurpose cooking tool, comprising:
a spatula assembly, wherein said spatula assembly includes a spatula having a head and a handle, wherein said handle is curved, said handle having a top cavity and a bottom cavity, wherein said head is substantially circular, said head protruding diagonally forward from said handle, wherein within each of said top cavity and said bottom cavity is at least one magnet, said top cavity extends a partial length of said handle, said top cavity having a top indentation located on a bottom portion thereof, said bottom cavity having a bottom indentation located on a bottom portion thereof;
a tongs assembly, wherein said tongs assembly includes tongs having tongs prongs and a prongs handle, wherein said tongs prongs protrude upwardly from said handle, said tongs prongs are separated a predetermined distance, wherein said predetermined distance decreases in a top portion of said tongs prongs, said predetermined distance defining an U-shaped indentation, wherein said tong configured to be fitted into said top cavity surrounded by top handle sidewalls, wherein said prongs being compressed within said top cavity by said top handle sidewalls to close said tongs, said tongs being retrieved from said top cavity by means of said top indentation; and
a fork assembly, wherein said fork assembly includes a fork having a fork handle, a connecting portion and fork prongs, said fork prongs are connected to said fork handle by means of said connecting element, said connecting portion has a triangular opening in a central portion thereof, said triangular opening having an arch shape in a top portion thereof, wherein said fork handle is adapted to be fitted into said bottom cavity surrounded by bottom handle sidewalls, wherein said fork prongs are in constant abutting contact with a rear portion of said head providing support thereof when said fork handle is is secured to said handle within said bottom cavity by said bottom handle sidewalls, when said second utensil member is secured to said handle within said bottom cavity by said bottom handle sidewalls, said fork being retrieved from said top cavity by means of said bottom indentation, wherein said at least one magnet secures said tongs and said fork to said top cavity and said bottom cavity respectively.

12. A system for a multipurpose cooking tool, consisting of:
a spatula assembly, wherein said spatula assembly includes a spatula having a head a neck and a handle, wherein said handle has a rod shape, said handle has a greater length than the length of said neck, said neck having a predetermined curvature, said handle having a top cavity and a bottom cavity, wherein said head is substantially circular, said head protruding diagonally forward from said handle, wherein within each of said top cavity and said bottom cavity is at least one magnet, said top cavity extends a partial length of said handle, said top cavity having a top indentation located on a bottom portion thereof, said bottom cavity having a bottom indentation located on a bottom portion thereof, wherein said head includes first grip members in a front-top portion thereof, wherein said spatula includes a lip extending about the perimeter of said head, said lip is flatter than said head;
a tongs assembly, wherein said tongs assembly includes tongs having tongs prongs and a prongs handle, wherein said tongs prongs protrude upwardly from said handle, said tongs prongs are two prongs separated a predetermined distance, wherein said predetermined distance decreases in a top portion of said tongs prongs, wherein said predetermined distance defining an U-shaped indentation, wherein said tong configured to be fitted into said top cavity surrounded by top handle sidewalls, wherein said prongs being compressed within said top cavity by said top handle sidewalls to close said tongs, said tongs being retrieved from said top cavity by means of said top indentation, wherein said tongs handle includes second grip members therein, wherein said first grip members and said second grip members extending horizontally and being adjacent to each other, wherein said tongs prongs expand outwardly from said U-shaped indentation, wherein said tongs prongs retract towards the center of said U-shape indentation, said U-shaped indentation having a top portion and a bottom portion, said bottom portion having a length larger than a length of said top portion; and a fork assembly, wherein said fork assembly includes a fork having a fork handle, a connecting portion and fork prongs, said fork prongs are connected to said fork handle by means of said connecting element, said connecting portion has a triangular opening in a central portion thereof, said triangular opening having an arch in a top portion thereof, wherein said fork handle is adapted to be fitted into said bottom cavity surrounded by bottom handle sidewalls, wherein said fork prongs are in constant abutting contact with a rear portion of said head providing support thereof, when said second utensil member is secured to said handle within said bottom cavity by said bottom handle sidewalls, said fork being retrieved from said top cavity by means of said bottom indentation, wherein said at least one magnet secures said tongs and said fork to said top cavity and said bottom cavity respectively.

* * * * *